F. T. NICHOLSON.
PAPER RECEPTACLE.
APPLICATION FILED JUNE 4, 1914.

1,178,748.

Patented Apr. 11, 1916.
4 SHEETS—SHEET 1.

F. T. Nicholson
Inventor

F. T. NICHOLSON.
PAPER RECEPTACLE.
APPLICATION FILED JUNE 4, 1914.

1,178,748.

Patented Apr. 11, 1916.
4 SHEETS—SHEET 2.

Witnesses:
William P Johnson
S S Dunham

F. T. Nicholson
Inventor
By his Attorneys
Kerr, Page, Cooke & Hayward

F. T. NICHOLSON.
PAPER RECEPTACLE.
APPLICATION FILED JUNE 4, 1914.
1,178,748.
Patented Apr. 11, 1916.
4 SHEETS—SHEET 3.
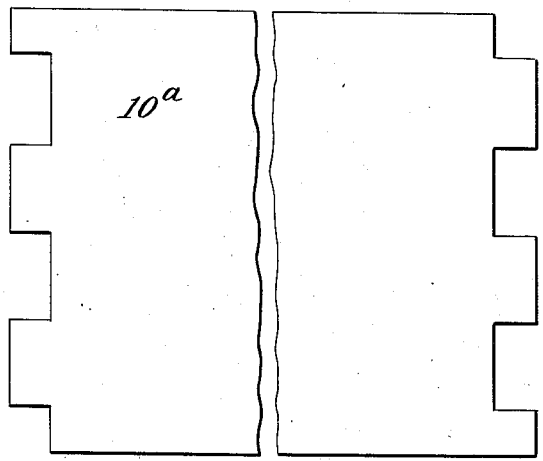
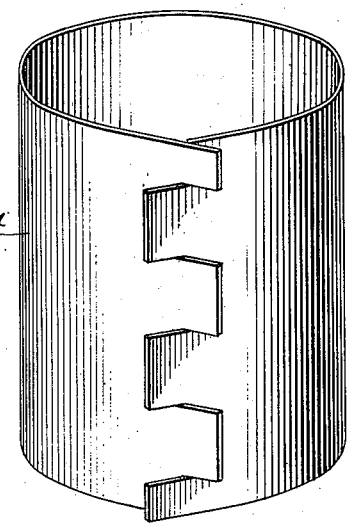
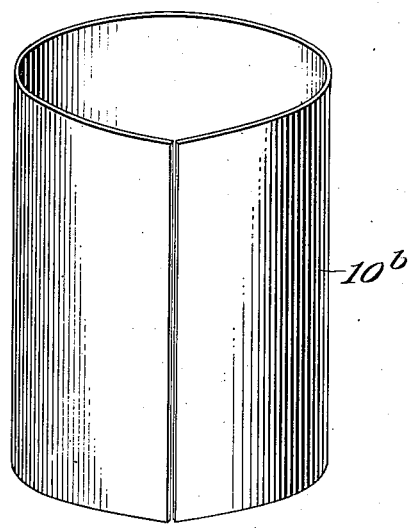
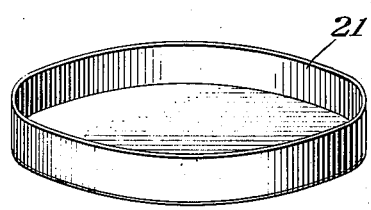
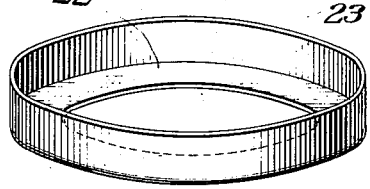

F. T. NICHOLSON.
PAPER RECEPTACLE.
APPLICATION FILED JUNE 4, 1914.

1,178,748.

Patented Apr. 11, 1916
4 SHEETS—SHEET 4.

F. T. Nicholson
Inventor

UNITED STATES PATENT OFFICE.

FRED T. NICHOLSON, OF BLOOMFIELD, NEW JERSEY.

PAPER RECEPTACLE.

1,178,748.

Specification of Letters Patent.

Patented Apr. 11, 1916.

Application filed June 4, 1914. Serial No. 843,035.

*To all whom it may concern:*

Be it known that I, FRED T. NICHOLSON, a citizen of the United States, residing at Bloomfield, in the county of Essex and State of New Jersey, have invented certain new and useful Improvements in Paper Receptacles, of which the following is a full, clear, and exact description.

This invention relates to paper receptacles or containers, particularly water-proof receptacles for liquids or semi-liquids, or for perishable goods or other materials which are to be protected from moisture, dust, and other sources of contamination. Efforts to provide such containers have been made heretofore, but so far as I am aware none of them has been wholly successful. In some of the prior containers the defects have been inherent in the article or in its mode of construction; while others, which have given greater promise of success, have proved impracticable by reason of high cost of manufacture. I have accordingly been led to devise my present invention, which has for its chief object to provide an improved container or receptacle which shall possess the necessary qualities of strength and durability so as to bear handling and shipping, etc., and which can be manufactured at low cost.

To these and other ends the invention consists in the novel features of construction and combinations of elements, hereafter described.

A convenient and effective embodiment of the invention is illustrated in the accompanying drawings, in which—

Figure 1:
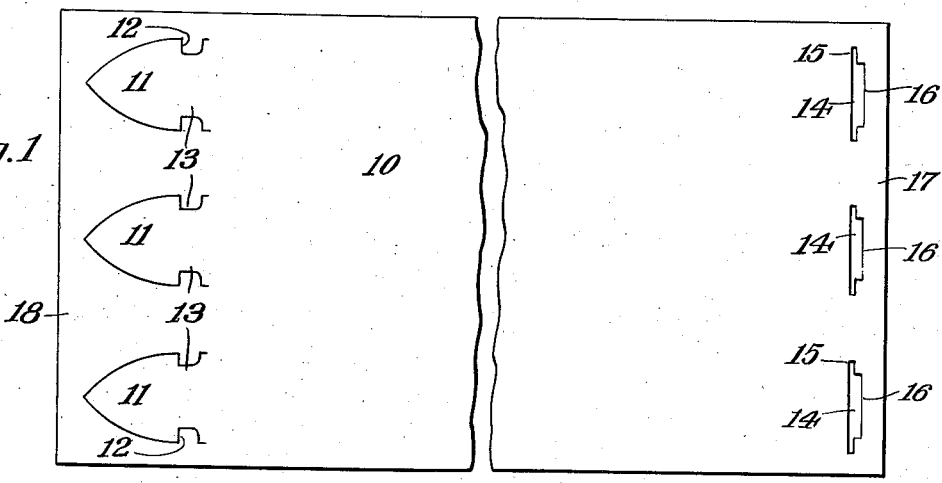
Figure 2:
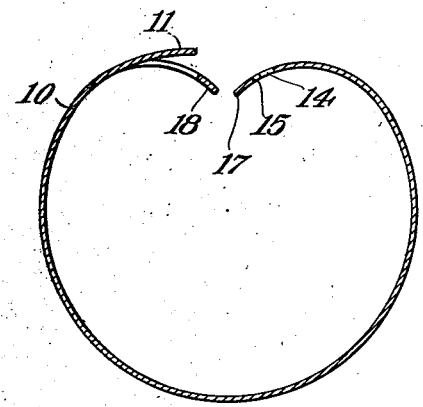
Figure 3:
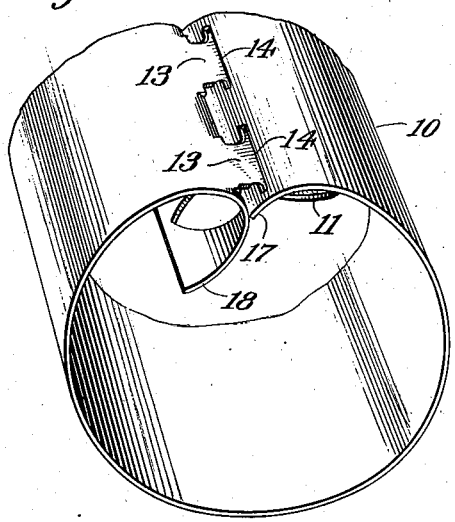
Figure 4:
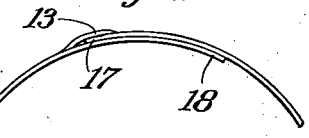
Figure 5:
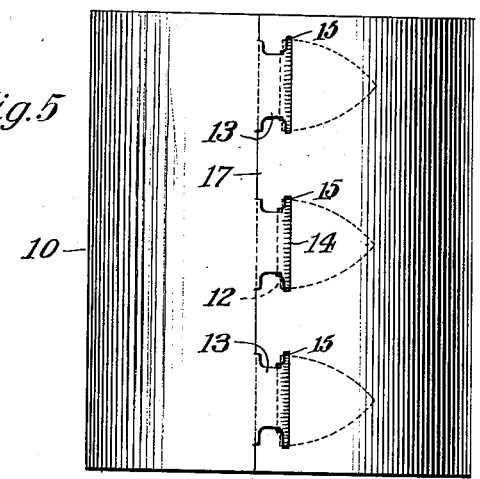
Figure 6:
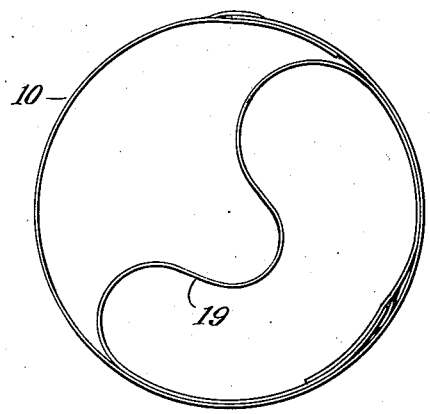
Figure 7:
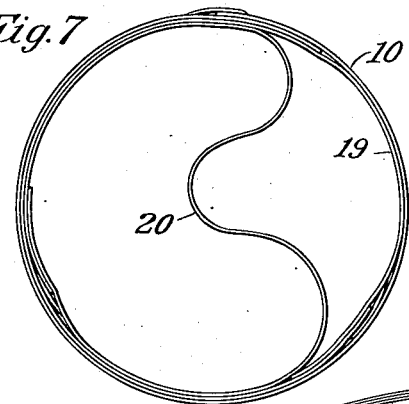
Figure 8:
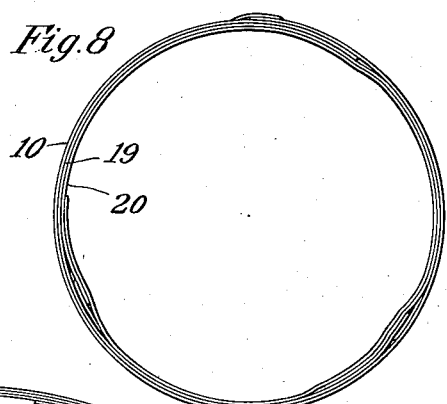
Figure 9:
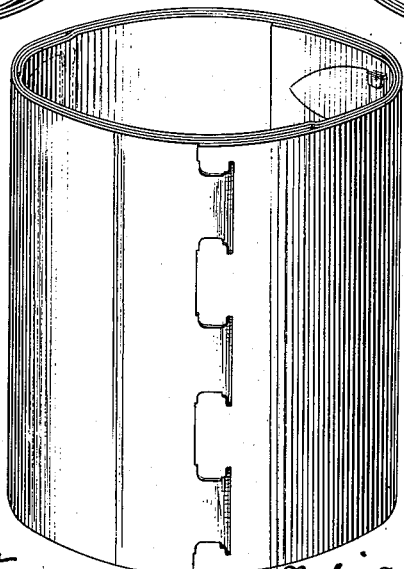
Figure 15:
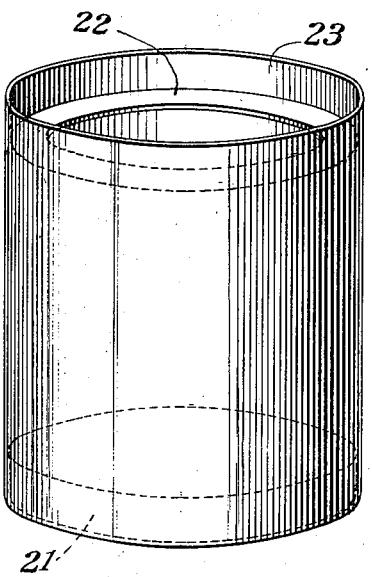
Figure 16:
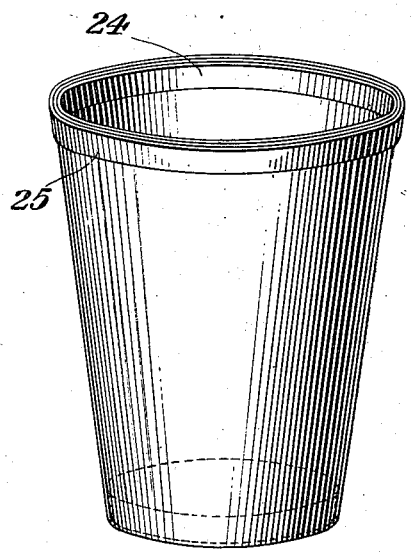
Figure 17:
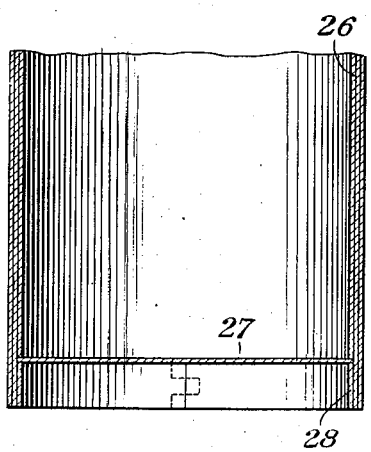
Figure 18:
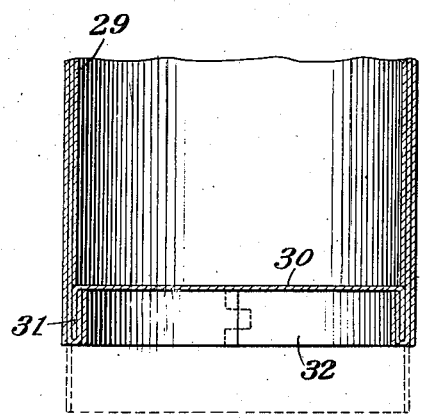

Figure 1 shows in plan a sheet or strip of paper as cut preparatory to shaping or bending to form the body or part of the body of the container. Fig. 2 is a cross section of the strip of paper as bent preparatory to locking its ends together to form a cylinder or other tubular body. Fig. 3 is a perspective view showing the tubular body formed by bending the paper strip, but with the locking of the ends of the strip incomplete. Fig. 4 is a fragmentary end view of the tubular body, showing the lock as it appears when complete, and Fig. 5 is a side view of the same. Fig. 6 is an end or plan view showing the method of nesting two tubular bodies together to form a two layer body. Fig. 7 shows the nesting of a third body in the first two, to form a three-layer body. Fig. 8 is an end or plan view showing the three-layer body complete, and Fig. 9 is a perspective view of the same. Figs. 10, 11 and 12 illustrate other tubular shells which may be used in the container. Fig. 13 shows in perspective a closure suitable for use with my improved container or receptacle. Fig. 14 shows in perspective a suitable closure-seat for use when one closure is to be removable and replaceable. Fig. 15 shows in perspective a receptacle having one closure permanently fixed in position and a seat for a removable closure. Fig. 16 shows in perspective a receptacle designed for use as a drinking cup. Figs. 17 and 18 show other forms of closure-construction suitable for my improved container.

My improved container, preferably but not necessarily circular in cross-section, is formed of one or more paper shells or tubes, each formed by bending a strip of paper and locking the ends of the strip together; the dimensions and proportions of the strip or strips being dependent upon the capacity and proportions which the finished container is to have. Such a strip is shown at 10 in the drawings, and is shown in plan in Fig. 1. The strip is cut at one end to form longitudinally extending tongues 11 (preferably pointed as shown) having shoulders 12 and shouldered necks 13 connecting the tongues to the body of the strip. At the other end the strip is provided with the same number of transverse slots 14, having at their inner edges lateral slits or extensions 15 to permit the aforesaid tongues to pass, the slots themselves being of substantially the same width as the necks 13. Moreover, the distance between the outer edges 16 of the slots and the end-edge of the strip is about equal to the length of the necks 13. The strip of paper, provided at its ends with tongues and slots as illustrated in Fig. 1, is now bent around a transverse axis, for example as shown in Fig. 2, in which it will be observed that the end-edges of the strip are turned in toward the axis of the tube. The arrow-shaped tongues are next passed into the slots 14 through the lateral extensions 15 and the necks 13 are drawn down into the slots as in Fig. 3, still keeping the end-portions of the strip bent in toward the axis of the tube.

Having inserted the tongues into the slots as explained above and as shown in Fig. 3, the end 17 is pushed up into the bight between the necks and the body of the papers, thereby permitting the end 18 to spring up, against the inner surface of the tube, as in Fig. 4. The tube now has the appearance shown in Fig. 5, in which it will be seen that the paper between the slots 14 and the adjacent end-edge is bound between the shoulders 12 on the tongues and the bight forward formed by the necks 13 and the body of the tube. If the attempt is made to expand the tube circumferentially the pull is resisted by the tongue-shoulders 12, and hence such expansion is prevented. Similarly, the tube cannot be contracted circumferentially, since the edge of the end 17 is already snugly fitted into the bight at the base of the necks 13. Nor can either end of the strip be shifted laterally with respect to the other, since the necks 13 are seated in the body portions of the slots 14, which body portions are no wider than necessary to receive said necks and allow the same to lie flat without wrinkling. In short, the ends of the strip are positively locked against displacement relative to each other in any direction laterally and circumferentially, so that the shell has a fixed perimeter.

If the container is to be water or moisture-proof, the paper of which the shell is made is impregnated, or at least coated on one side, with suitable material, as for example, paraffin wax, preferably before the tongues and slots are cut. Paper so impregnated is common, and can be purchased in any desired quantity. If the impregnation is done after the tube is formed it can be effected by dipping the tube into melted paraffin and keeping the tube hot till the surplus wax has drained off. If the tube is made of paper already impregnated or coated it is simply heated in any convenient manner, as in any suitable oven, to a temperature sufficient to soften or melt the wax. As the natural resiliency of the paper produces a stress tending to expand the tube radially, it will be seen that the parts which constitute the "lock" are held snugly against each other, with the result that when the wax softens (and subsequently hardens as the tube cools) the contiguous surfaces are cemented together and all cracks filled with wax, making it impossible for water or other substances to penetrate the lock-joint. Moreover, in practice the slots and tongues are die-cut by machinery and hence fit accurately, thereby insuring the production of a thoroughly tight joint by the fusion and subsequent congelation of the wax or other cementitious substance with which the paper or the ends thereof are impregnated.

If the paper has sufficient body and stiffness to serve the purpose for which the container is intended the tube may now be considered complete, and the heads or closures may be put in place. If not, the tube or shell can be built up to any desired thickness and strength by nesting two or more tubes together. Such inner shells may be made with the same lock as the outer shell, but are of successively smaller diameter. The shells are assembled as illustrated in Fig. 6, the inner shell 19 being laterally invaginated so that it can be inserted in the outer, after which the inner shell springs out to its original form, as in Fig. 7, the resiliency of the paper causing the inner shell to bear snugly against the outer. If desired, a third shell, 20, or as many as may be needed to give the body the proper strength, can be inserted, as in Fig. 7, preferably staggering the several joints and spacing them equally around the circumference. The three-ply shell then has the appearance shown in Fig. 8.

As many shells having been assembled as may be necessary or desirable to form the body of the receptacle, the whole is heated to melt the wax with which the shells are impregnated. Inasmuch as each inner shell is pressed snugly against the contiguous outer shell by the natural resiliency of the paper, combined with the fact that the shells are unable to contract by reason of the peculiar mechanical locking of the ends of the strip, the heating and subsequent cooling cause the shells to adhere together and seal the joints, with the result that the body becomes to all intents and purposes an integral, homogeneous whole.

Since the assembled or nested shells are heated to seal them together, it is not necessary to heat each shell separately, before nesting. Nor is it necessary that each shell be impregnated or coated with wax before assembly, as the nested shells can be sealed together by dipping after assembly into melted wax. I prefer, however, to make the shells, or at least the outermost and innermost, of paper impregnated or coated with wax and then seal them only after they have been assembled.

Instead of making all the shells of strips having their ends locked against all relative displacement axially and circumferentially, as in Fig. 5, for example, the inner shell or shells may have the ends of the strips locked to prevent axial displacement of the ends and contraction of the perimeter. For such purpose the joint shown in Figs. 10 and 11 answers very well. Here the strip $10^a$, Fig. 10, has its ends tongued and notched to fit snugly together when bent to form the tubular shell, as in Fig. 11. The joint itself then prevents axial displacement of either end and also prevents contraction of the perimeter, expansion being prevented by the outermost shell (of fixed perimeter) after the shells are nested together. Or, the innermost shell may be like Fig. 5 or Fig. 10, for example, and any shell or shells used between the innermost and outermost may be formed of plain strips, as $10^b$, Fig. 12, of such length that their ends will be practically, if not actually, in contact when nested into the outer shell. The outermost shell then prevents expansion of all the inner shells and the innermost prevents contraction of the intermediate shell or shells.

The ends for the tubular body may be in the form of shallow cups, as 21, formed by die-pressing a disk of card, or paper of the requisite stiffness, or several layers of thin paper, the cup being formed by any suitable machine before or after impregnation with the wax or other cementitious substance. Usually, one of the closures is permanently secured in place and the other is intended to be removable. For the latter it is convenient to provide an annular seat, as 22, provided with an upstanding flange 23, the whole being formed by die-pressing, as in the case of the permanent closure already described. Both the permanent closure and the seat for the removable closure are secured in place by adhesion of the wax with which they and the tubular body are impregnated, such adhesion being produced by heating the parts after they are assembled. The preferred method is to insert the closure and the seat before the nested shells are heated to cement them together, so that a single heating suffices for both purposes.

The receptacle now appears as in Fig. 15. The open end may be closed by a removable disk of card or sheet metal (not shown), or by a removable cup of metal or card like that illustrated in Fig. 13. Also, both closures may be of metal suitably shaped; and both, whether of paper, cardboard, or metal can be removable, or one removable and replaceable, or neither replaceable. In the latter case the contents of the receptacle must of course be inserted before the second closure is secured in place. The chief advantage of using cup-shaped closures lies in the reinforcement which they give to the ends of the tubular body. Of course for some purposes, as, for example when the receptacle is intended for use as a drinking cup for soda fountains, only one closure need be provided. In such cases the upper edge of the cup can be reinforced, as by a ring or wax-impregnated paper or cardboard inside or outside of the body, or both, as in Fig. 16, where inner and outer reinforcing rings are shown at 24 and 25, respectively.

Another form of permanent-closure construction is illustrated in Fig. 17. Here the innermost shell 26 is shorter than the rest, to provide a seat for the disk 27. If the adhesion of the wax or other cementitious substance at the edge of the disk and the friction of the disk on the tubular body are not sufficient to hold the disk in place with the desired security additional support may be provided by means of a ring 28 below the disk. This ring may be formed, for example, by bending a narrow strip of thick paper, or of several rings nested together like the body. A joint like that shown in Fig. 11 can be used to prevent contraction of the ring or of the innermost ring, and axial displacement of the ends of the strip or strips. The ring 28, whether composed of one or a plurality of thicknesses, is preferably cemented in place. In the closure construction shown in Fig. 18 the innermost shell 29 is short, to afford a seat for the inverted cup-shaped closure 30, and the next outer shell is longer, as indicated in dotted lines. This depending portion is turned up over the closure flange 31 and is preferably of such length as to come in contact with the body of the closure. If the wax or other cement used is not sufficient to prevent the turned-up portion of the shell from wrinkling or otherwise coming away from the closure flange a stiff ring 32, like that shown at 28 in Fig. 17, may be inserted to hold such turned up portion in place. The construction shown in Fig. 18 makes the closure practically an integral part of the body, and also affords a very strong rim, capable of withstanding pressure or blows of considerable force without material injury, if any.

The provision of a tubular container-body which is composed of one or more layers or thicknesses but which is, as a whole, of fixed perimeter, is a highly important feature, for the reason, among others, that the body maintains its proper form during the heating and cooling without the necessity of using an inner or an outer support to prevent contraction or expansion. Heretofore in making containers, as by coiling a strip of paper on a mandrel and subsequently or simultaneously cementing the coils together with wax, the cementing must be done while the shell is on the mandrel, and while the convolutions or turns are held on the outside to prevent their uncoiling; after which the tube so formed must be freed from the mandrel and the outer supporting or holding devices. This has so lengthened the time of manufacturing each individual container as to make the ultimate cost prohibitive. In my container, however, the shell or shells cannot uncoil or otherwise change their form after assembly, and hence do not require to be held on a mandrel or in a sleeve or by other means for a similar purpose during the heating, but can simply stand on end in an oven or other heating chamber.

I have specified "paper" as the material of which the receptacle is made, but it is to be understood that any other suitable fabric can be used for the purpose.

It is to be understood that the invention is not limited to the construction herein specifically described.

What I claim is:

1. A receptacle or container, comprising a tubular body composed of a plurality of nested shells of which at least the outermost is of fixed perimeter and is formed of a strip of paper bent to tubular form and having at its ends interlocking means effective throughout substantially the entire length of said outermost shell for preventing relative displacement of the ends axially and circumferentially, each inner shell bearing snugly against the contiguous outer shell; and a closure for the tubular body.

2. A receptacle or container, comprising a tubular body composed of a plurality of nested shells, at least the outermost shell being of non-expansible perimeter and formed of a strip of paper bent to tubular form and having at its ends interlocking means effective throughout substantially the entire length of said outermost shell for preventing relative displacement of the ends axially and circumferentially, and the innermost shell having at its ends interlocking means effective against contraction of the shell throughout substantially its entire length, whereby the two or more shells of which the receptacle is composed are positively held in snug contact with each other; and a closure secured to the tubular body at an end of the same.

3. A receptacle or container comprising a tubular body composed of a plurality of nested shells of which at least the outermost is of fixed perimeter and is formed of a strip of paper bent to tubular form and having at its ends interlocking means effective throughout substantially the entire length of said outermost shell for preventing relative displacement of the ends in any axial or circumferential direction, the several shells bearing against each other and cemented together by moisture-proof cementitious material; and a moisture-proof closure secured to the body at an end thereof.

4. A receptacle or container comprising a tubular body composed of a plurality of nested shells of which at least the outermost is of fixed perimeter, impregnated with water-proof cementitious material and cemented together thereby, each shell being composed of a strip of paper bent to tubular form and the outermost having at its ends interlocking means effective throughout substantially the entire length of said outermost shell for preventing relative displacement of the ends axially and circumferentially; and a water-proof closure secured to the body at an end of the same.

5. A receptacle or container comprising a tubular body composed of a plurality of nested shells of which at least the outermost is formed of a strip of paper having at its ends interlocking means integral with the strip and effective throughout substantially the entire length of the shell for preventing relative displacement of the ends axially and circumferentially, each inner shell bearing snugly against the contiguous outer shell; and a closure for the tubular body.

6. In a receptacle, a tubular body composed of a plurality of nested shells at least the outermost being of non-expansible perimeter and formed of a strip of paper bent to tubular form and having at its ends interlocking means effective throughout substantially the entire length of the said outermost shell for preventing relative displacement of the ends axially and circumferentially, and the innermost shell having at its ends interlocking means effective against contraction throughout substantially the entire length of the innermost shell, whereby the two or more shells composing the tubular body are positively held in snug contact with each other.

7. In a receptacle or container, a tubular shell for the body thereof, comprising a strip of paper having at one end one or more outwardly extending tongues connected to the paper by necks of less width than the tongues to form lateral shoulders at the juncture of the tongues and the necks, the necks terminating inside the adjacent end-edge of the strip, the strip having in its other end one or more transverse slots of substantially the same width as said necks, spaced from the adjacent end-edge of the strip a distance substantially equal to the length of the aforesaid necks and having lateral slits or extensions at their inner edges, the strip being bent to a tubular form of suitable cross-sectional contour and having the said tongues extended through said slots with the said shoulders on the inside between the said slits or extensions and the edge of the end in which the latter are formed, the said necks lying in the said slots and the edge of the end in which the latter are formed extending into and fitting the bight between the said tongues and the body of the paper; whereby the ends of the strip are mechanically locked against relative displacement in any axial or circumferential direction.

8. In a receptacle or container, a tubular shell for the body thereof, comprising a strip of paper bent to tubular form, the strip having at one end one or more transverse slots and at the other one or more tongues extending from the body of the strip inside the adjacent end-edge thereof and inwardly through said slots and having shoulders on the inside coöperating with the inner edges of the slots to prevent circumferential expansion and the edge of the end having the slots extending into and fitting the bight between the tongues and the body of the strip to prevent circumferential contraction, the side-edges of the slots coöperating with the tongues to prevent axial displacement of either end relative to the other.

9. A blank for use in forming the body of a receptacle or container, consisting of a strip or sheet of paper having at one end one or more outwardly extending tongues connected to the strip by necks, inside of the adjacent end-edge of the strip to provide a bight between the inner edge of the tongues and the body of the strip, said tongues being provided with lateral shoulders at their juncture with the necks, the sheet or strip having at its other end one or more transverse slots of substantially the same width as the aforesaid necks and having lateral slits or extensions at their inner edges, said slots being spaced from the adjacent edge of the sheet or strip a distance substantially equal to the length of the necks.

In testimony whereof I hereunto affix my signature in the presence of two subscribing witnesses.

FRED T. NICHOLSON.

Witnesses:
M. LAWSON DYER,
S. S. DUNHAM.